United States Patent [19]

Andre et al.

[11] Patent Number: 5,700,041
[45] Date of Patent: Dec. 23, 1997

[54] RADIALLY ENGAGEABLE LEAKPROOF COUPLING

[75] Inventors: Michel Andre, Romorantin Lanthenay; Pascal Detable, Gievres, both of France

[73] Assignee: Etablissements Caillau, Issy les Moulineaux, France

[21] Appl. No.: 668,242

[22] Filed: Jun. 21, 1996

[30] Foreign Application Priority Data

Jun. 30, 1995 [FR] France ................. 95 07902

[51] Int. Cl.$^6$ ..................................... F16L 17/06
[52] U.S. Cl. ............................. 285/325; 285/349
[58] Field of Search ........................ 285/325, 326, 285/327, 349

[56] References Cited

U.S. PATENT DOCUMENTS

| | | | |
|---|---|---|---|
| 33,430 | 10/1861 | Feyh | 285/325 |
| 198,643 | 12/1877 | Manville et al. | 285/325 |
| 283,771 | 8/1883 | Genin | 285/325 |
| 760,710 | 5/1904 | Simpson | 285/325 |
| 1,866,905 | 7/1932 | Prompt . | |
| 2,056,562 | 10/1936 | Bridge | 285/325 X |
| 2,092,243 | 9/1937 | Breese . | |
| 2,279,733 | 4/1942 | Cross | 285/325 X |
| 2,950,130 | 8/1960 | Schneider | 285/325 X |
| 4,037,654 | 7/1977 | Lien | 285/325 X |
| 5,383,691 | 1/1995 | Anthony | 285/325 |

FOREIGN PATENT DOCUMENTS

| | | |
|---|---|---|
| 0247534 | 12/1987 | European Pat. Off. . |
| 421561 | 2/1911 | France . |
| 1350361 | 4/1964 | France . |
| 748940 | 11/1944 | Germany . |
| 1828907 | 3/1961 | Germany . |
| 632030 | 11/1949 | United Kingdom ........... 285/325 |

OTHER PUBLICATIONS

French Search Report and Annex issued in connection with French Application No. 95 07902, dated Feb. 29, 1996.

*Primary Examiner*—Dave W. Arola
*Attorney, Agent, or Firm*—Marshall & Melhorn

[57] ABSTRACT

A sealed coupling comprises first and second endpieces. Beyond its end, the first endpiece has a U-shaped axial extension provided with a transverse groove. The second endpiece is provided with a radially outwardly extending and substantially circular flange. The flange is suitable for being engaged in the groove during relative transverse displacement of the two endpieces. The end of one of the endpieces is provided with a circular sealing gasket. The second endpiece has a resilient collar with a radial face that bears against the second radial wall of the groove, and one of the two endpieces has a projection situated for penetrating into a setback in the other endpiece.

3 Claims, 1 Drawing Sheet

U.S. Patent    Dec. 23, 1997    5,700,041
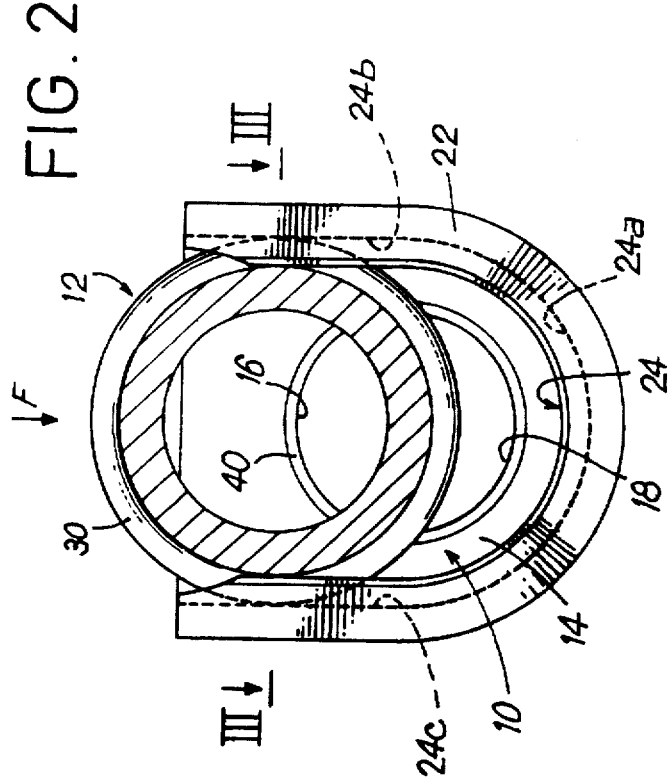
FIG. 2
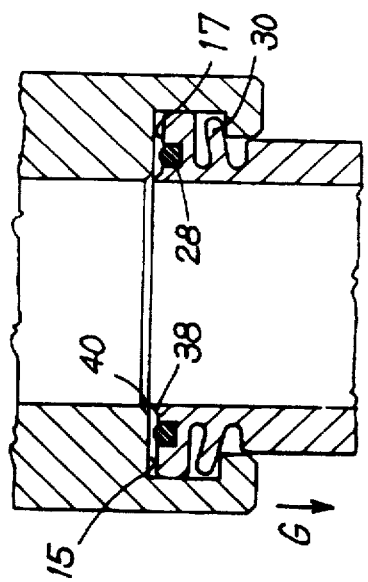
FIG. 3
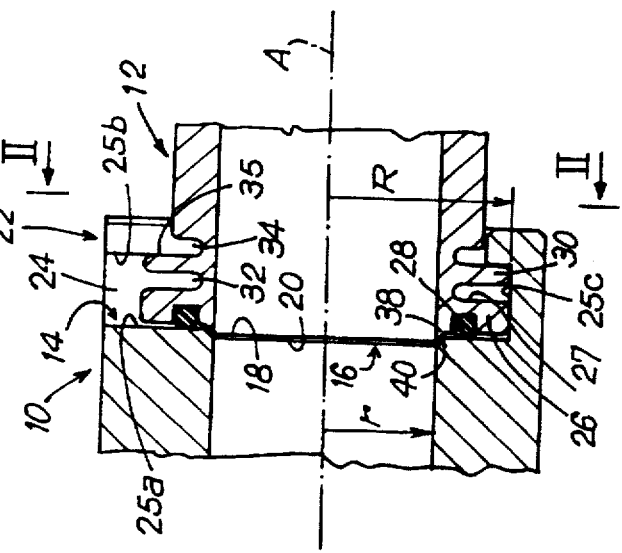
FIG. 1
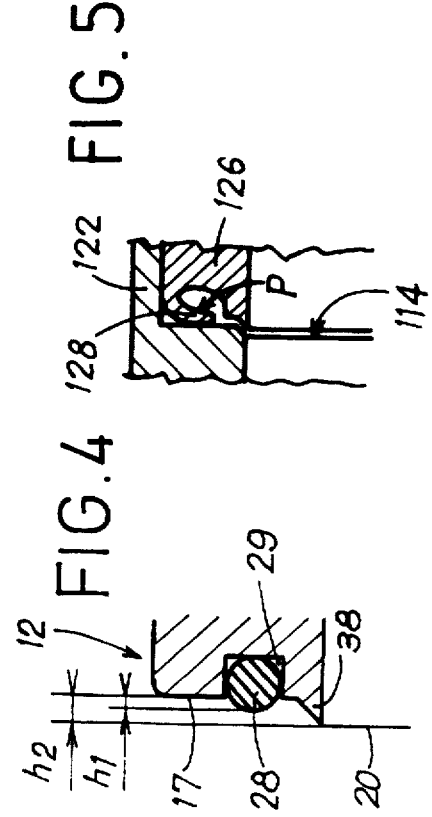
FIG. 5
FIG. 4

RADIALLY ENGAGEABLE LEAKPROOF COUPLING

FIELD OF THE INVENTION

The present invention relates to a leakproof coupling comprising first and second tubular endpieces each having an end provided with an orifice.

Beyond its end, the first endpiece has a U-shaped axial extension provided with a transverse groove, the extension comprising a semicircular portion of radius greater than the radius of the orifice of the first endpiece, and two rectilinear portions situated at either end of said semicircular portion. Said groove has a first radially-extending side wall situated adjacent to the end of the first endpiece and a second radially extending side wall facing the first.

The second endpiece is provided with a substantially circular flange projecting radially outwards and having a radial face facing in the opposite direction to the end of said second endpiece. The flange is suitable for being engaged in the groove during relative transverse displacement of the two endpieces for the purpose of coupling the two endpieces together. The end of one of the endpieces is provided with a circular sealing gasket that projects axially beyond said end and that is suitable for coming into leakproof contact with the end of the other endpiece.

BACKGROUND OF THE INVENTION

The French patent published under the number 1 350 361 discloses a leakproof coupling of the above type, which has the advantage of not requiring axial engagement since engagement is provided by relative transverse displacement of the two endpieces. This makes it possible to put the coupling into place even when very little axial clearance is available, as can be the case, in particular, in certain motor industry applications where the coupling needs to be put into place in situ beneath the hood of a vehicle where available volume can be very small. Prior to being coupled in leakproof manner with the other endpiece, at least one of the two endpieces may receive a hose which is engaged by force or is possibly clamped on said endpiece by means of a collar.

Unfortunately, the prior art coupling suffers from a drawback insofar as the circular sealing gasket projects axially beyond the end of the endpiece on which it is mounted so the gasket rubs against the end of the outer endpiece throughout the engagement stroke. This gives rise to severe risks of premature wear and of creep, such that sealing is not always ensured on a long-term basis.

OBJECTS AND SUMMARY OF THE INVENTION

An object of the present invention is to remedy the above drawback and to propose a coupling in which gasket rubbing is avoided or at least restricted during relative displacement of the two endpieces for the purpose of connecting them together, and in which leakproof coupling is ensured when the endpieces are in the coupling positions.

This object is achieved by the second endpiece having a radial collar that is resiliently flexible in an axial direction and that has a radial face facing away from the end of said second endpiece, said radial face being suitable for bearing against the second radial wall of the groove when the flange is engaged in said groove, and by one of the first and second endpieces having an axial projection situated in the vicinity of the edge of its orifice, while the other one of the two endpieces has an axial setback situated in the vicinity of the edge of its orifice suitable for receiving said axial projection when the endpieces are in the coupled-together position.

By these dispositions, during at least a portion of the engagement stroke of the flange in the groove, the free end of the axial projection co-operates with the front face of the end of the other part (the part that does not include the projection). The gasket is thus protected from excessive rubbing during the engagement stroke. On this occasion, the radial collar is urged resiliently in the direction of increasing separation between the ends of the two endpieces.

At the end of the engagement stroke, the projection is received in the axial setback under the effect of the resilience of the collar whose radial face bears against the second wall of the groove. At this time, the resilient collar also urges the gasket into leakproof contact with the end of the facing endpiece.

Advantageously, the axial setback is of a shape that is complementary to that of the projection.

BRIEF DESCRIPTION OF THE DRAWING

The invention will be well understood and its advantages will appear more clearly on reading the following detailed description of an embodiment given by way of non-limiting example.

The description refers to the accompanying drawing, in which:

FIG. 1 is a fragmentary axial section view of a coupling of the invention with its two endpieces being shown coupled together;

FIG. 2 is a section view in a plane marked by line II—II in FIG. 1, showing the two endpieces partway through the engagement stroke;

FIG. 3 is a section view on line III—III of FIG. 2;

FIG. 4 is a fragmentary axial section view showing a detail of the end of one of the endpieces; and FIG. 5 is a fragmentary axial section view showing a variant embodiment of the sealing gasket, in which the two endpieces are in the coupled-together position.

MORE DETAILED DESCRIPTION

FIGS. 1 to 3 show a leakproof coupling comprising a first tubular endpiece 10 and a second tubular endpiece 12. For simplification purposes, only the end portions of these endpieces are shown. It should be understood that they may be connected to tubes by any known means or that they may constitute the ends of said tubes. Each of the endpieces has a respective end 14, 16 provided with a respective orifice 18, 20.

Beyond its end 14, the first endpiece 10 has a U-shaped axial extension 22 provided with a transverse groove 24. More precisely, the bottom 25c of the groove 24 has a semicircular portion 24a of radius R greater than the radius r of the orifice 18 of the first endpiece, together with two rectilinear portions 24b and 24c situated at opposite ends of the semicircular portion 24a. The groove 24 also has a first radial wall 25a situated adjacent to the end 14 of the first endpiece and a second radial wall 25b on its opposite side, facing the first wall.

Naturally, when in their coupling position, the two endpieces are in alignment on a common axis A. The orifice 20 of the first endpiece 12 has the same radius r as the orifice 18 of the first endpiece.

The second endpiece 12 is provided with a flange 26 that is substantially circular, that projects radially outwards, and that has a radial face 27 facing in the opposite direction to the end 16 of said second endpiece. In the example shown, the outside radius of the flange 26 is substantially equal to the radius R of the semicircular portion 24a of the groove, such that in the coupling position, the flange 26 co-operates with the bottom 25c of the groove 24. The flange is thus suitable for being engaged in the groove 24 by relative transverse displacement between the two endpieces, during which the second endpiece is moved relative to the first in the direction of arrow F in FIG. 2.

The end 16 of the second endpiece 12 is provided with a circular sealing gasket 28 which, as can be seen more clearly in FIG. 4, projects axially beyond said end. This gasket is suitable for coming into sealing contact with the end of the first endpiece 10 and more precisely with the front face 15 thereof, when the endpieces are in the coupled-together position. Alternatively, a similar gasket could be mounted at the end 14 of the first endpiece 10, to come into sealing contact with the end 16 of the second endpiece when the endpieces are in the coupled-together position, and more precisely to come into contact with the front face 17 thereof.

The second endpiece 12 has a radial collar 30 which is located behind the flange 26, i.e. further away from the end 16. The collar 30 is flexible in the axial direction. For this purpose, annular grooves 32 and 34 are provided in the outer periphery of the second endpiece on either side of the collar 30.

The two endpieces may be made out of materials that are relatively rigid, e.g. high density rubber. The collar is given axial flexibility firstly by its small axial thickness relative to its radial height, and secondly by the presence of the grooves 32 and 34.

The collar has a radial face 35 facing away from the end 16 of the second endpiece 12. As can be seen in FIG. 1, this radial face 35 is suitable for bearing against the second radial wall 25b of the groove 24 when the flange 26 is engaged in said groove. In other words, the groove receives the assembly made up of the flange 26 and the collar 30.

The second endpiece 12 has an axial projection 38 situated in the vicinity of the edge of its orifice 16, while in the vicinity of the edge of its orifice 14, the first endpiece 10 has an axial setback 40 suitable for receiving the axial projection 38 when the endpieces are in the coupled-together position, as shown in FIG. 1.

In the example shown, the axial projection 38 and the axial setback 40 are frustoconical and complementary in shape, with the axial projection tapering along the axis A going from the second endpiece towards the first. When in the coupled-together position, these complementary shapes provide relative fitting between the endpieces 10 and 12. However, complementary shapes can be omitted, the essential point being that the projection 38 should be capable of engaging in the setback 40 without impeding sealing contact of the gasket 28. In addition, provision could also be made to provide the axial projection in the vicinity of the edge of the orifice of the first endpiece while providing the edge of the orifice of the second endpiece with the axial setback.

By providing the axial projection and setback, the gasket is prevented from rubbing while the second endpiece is being engaged in the first. As shown in FIG. 3, the end of the projection 38 co-operates with the front face 15 of the end 14 of the first endpiece 10 while engagement is taking place, so long as the second endpiece has not reached its final engagement position. This tends to push the second endpiece back away from the first in the direction of arrow G in FIG. 3, thereby spacing the gasket 28 correspondingly from the front face of the end 14 of the fist endpiece. Simultaneously, the collar 30 is subjected to resilient thrust in the direction opposite to arrow G, i.e. in the direction going towards the end of the first endpiece.

At the end of the engagement stroke, the second endpiece reaches its coupling position relative to the first, and in this position the axial projection 38 engages in the axial setback 40. As a result, the radial collar 30 returns to its natural radial position under the effect of its own resilience, thereby tending to press the gasket 28 into sealing contact with the front face of the end of the first endpiece.

In order to avoid any contact between the gasket and the front face 40 while the projection 38 is co-operating therewith, it is preferable for the axial length $h_2$ of said projection 38 to be greater than the axial extent $h_1$ of the gasket 28 beyond the end 16 of the first endpiece.

As mentioned above, the gasket 28 and the projection 38 need not both be provided on the same endpiece. Under such circumstances, all contact is avoided between the gasket and the facing front face during the engagement stroke so long as the axial length of the axial projection is greater than the axial extent of the gasket beyond the end of the endpiece in which it is fitted.

FIG. 5 shows a variant embodiment of the gasket, and in FIG. 5 elements that are common to FIGS. 5 and 1 are given the same references as in FIG. 1, plus 100. In the preceding figures, the sealing gasket is constituted by an O-ring that is inserted in an annular groove 29 (FIG. 4) in the end of one of the endpieces. As shown in FIG. 5, it is also possible for the gasket 128 to be constituted by a resilient annular lip secured to the periphery of the flange 126 and extending axially beyond the end 116 of the second endpiece. The lip 128 converges towards the axis of the endpieces, so that when a fluid under pressure is passing through the coupling, the pressure tends to urge the lip 128 radially outwards, in the direction of arrow p, thereby further reinforcing sealing.

We claim:

1. A sealed coupling comprising first and second tubular endpieces each having an end provided with an orifice, beyond its own end, the first endpiece has a U-shaped axial extension provided with a transverse groove with a bottom that comprises a semicircular portion of a radius greater than a radius of the orifice of the first endpiece, together with two rectilinear portions situated at opposite ends of said semicircular portion, said groove having a first radial wall situated adjacent to the end of the first endpiece and a second radial wall facing the first, the end of one of the endpieces being provided with a circular sealing gasket that projects axially beyond said end and that comings into sealing contact with the end of the other endpiece, the second endpiece being provided with a substantially circular radially outwardly extending flange and with a radial collar that is resiliently flexible in an axial direction and that has a radial face facing away from the end of said second endpiece, said flange, together with said radial collar, engaged into the groove during relative transverse displacement of the two endpieces for the purpose of coupling said endpieces together, said radial face of the radial collar bearing against the second radial wall of the groove when the flange and the radial collar are engaged in said groove, one of the first and second endpieces having an axial projection situated in the vicinity of the edge of the orifice thereof, while the other of said endpieces has an axial setback situated in the vicinity of the edge of the orifice thereof, said setback receiving said axial projection when the endpieces are in a coupled-together position, said axial projection cooperating with the end of said other endpiece during an engagement stroke of the flange and the radial collar into the groove so that said radial collar is resiliently urged in a direction increasing separation between the ends of the two endpieces and is received in said axial setback under an effect of resilience of the radial collar at the end of said engagement stroke.

2. A coupling according to claim 1, wherein the axial projection and setback are frustoconical and complementary in shape.

3. A coupling according to claim 1, wherein the axial length of the axial projection is greater than the extent to which the sealing gasket projects axially beyond the end of the endpiece provided with said gasket.

\* \* \* \* \*